United States Patent
Ansari et al.

(10) Patent No.: US 12,051,806 B2
(45) Date of Patent: Jul. 30, 2024

(54) PRELITHIATION OF FREE-STANDING SILICON DOMINANT ANODE BATTERIES

(71) Applicant: Enevate Corporation, Irvine, CA (US)

(72) Inventors: Younes Ansari, Irvine, CA (US); Liwen Ji, Irvine, CA (US); Heidi Anderson, Irvine, CA (US); Benjamin Park, Irvine, CA (US); Vincent Giordani, Irvine, CA (US)

(73) Assignee: Enevate Corporation, Irvine, CA (US)

( * ) Notice: Subject to any disclaimer, the term of this patent is extended or adjusted under 35 U.S.C. 154(b) by 0 days.

(21) Appl. No.: 17/367,803

(22) Filed: Jul. 6, 2021

(65) Prior Publication Data

US 2023/0029191 A1   Jan. 26, 2023

(51) Int. Cl.
| | |
|---|---|
| *H01M 10/0525* | (2010.01) |
| *H01M 4/04* | (2006.01) |
| *H01M 4/134* | (2010.01) |
| *H01M 4/1395* | (2010.01) |
| *H01M 4/38* | (2006.01) |
| *H01M 4/60* | (2006.01) |
| *H01M 4/66* | (2006.01) |

(52) U.S. Cl.
CPC .......... *H01M 4/60* (2013.01); *H01M 4/0404* (2013.01); *H01M 4/0471* (2013.01); *H01M 4/134* (2013.01); *H01M 4/1395* (2013.01); *H01M 4/386* (2013.01); *H01M 4/661* (2013.01); *H01M 10/0525* (2013.01)

(58) Field of Classification Search
CPC ...... H01M 4/60; H01M 4/134; H01M 4/1395; H01M 4/386; H01M 4/0434; H01M 10/0525
See application file for complete search history.

(56) References Cited

U.S. PATENT DOCUMENTS

| | | | | |
|---|---|---|---|---|
| 2002/0102462 | A1* | 8/2002 | Huggins | H01M 10/44 429/231.9 |
| 2016/0172711 | A1* | 6/2016 | Yang | H01M 10/052 429/332 |
| 2021/0347787 | A1* | 11/2021 | Lee | H01M 4/1395 |
| 2022/0205107 | A1* | 6/2022 | Song | C23C 22/02 |

FOREIGN PATENT DOCUMENTS

| | | | |
|---|---|---|---|
| CN | 110120496 | * | 8/2019 |
| CN | 110120496 A | * | 8/2019 |
| CN | 110120496 A | | 8/2019 |

(Continued)

OTHER PUBLICATIONS

T. Tabuchi et al., Li-Doping Process for LixSiO-Negative Active Material Synthesized by Chemical Method for Lithium-Ion Cells, Journal of Power Sources, 2005, 146, pp. 507-509.

(Continued)

*Primary Examiner* — Osei K Amponsah
(74) *Attorney, Agent, or Firm* — McAndrews, Held & Malloy, Ltd.

(57) ABSTRACT

Systems and methods for batteries comprising a cathode, an electrolyte, and an anode, where prelithiation reagents are utilized to treat one or more of the anode and cathode. In one embodiment, the prelithiation reagent is a Li-organic complex solution comprising naphthalene and metallic lithium dissolved in an inhibitor-free THF.

2 Claims, 10 Drawing Sheets

(56) References Cited

FOREIGN PATENT DOCUMENTS

| KR | 20200105007 | * | 9/2020 | |
| KR | 20200105007 A | * | 9/2020 | |
| WO | WO-2020068870 A1 | * | 4/2020 | ............ H01M 4/386 |

OTHER PUBLICATIONS

T. Tabuchi et al., Mechanism of Li-Doping Into Li4Ti5 O12 Negative Active Material for Li-Ion Cells by New Chemical Method, Journal of Power Sources, 2006, 162, pp. 813-817.

A. Veluchamy et al., Improvement of Cycle Behavior of SiO/C Anode Composite by Thermochemically Generated Li4SiO4, Inert Phase for Lithium Batteries, Journal of Power Sources, 2009, 188, pp. 574,577.

N. Liu et al., Prelithiated Silicon Nanowires as an Anode for Lithium Ion Batteries, ACS Nano, 2011, 5, pp. 6487-6493.

H. Sun et al., Hard Carbon/Lithium Composite Anode Materials for Li-ion Batteries, Electrochimica Acta, 52, pp. 4312-4316.

L. Fei et al., Graphene Oxide Involved Air-Controlled Electrospray for Uniform, Fast, Instantly Dry, and Binder-free Electrode Fabrication, ACS Applied Materials & Interfaces, 2017, 9, pp. 9738-9746.

Y. Wang et al., Pre-Lithiation of Onion-Like Carbon/MoS2 Nano-Urchin Anodes for High-Performance Rechargeable Lithium Ion Batteries, Nanoscale, 2014, 6, pp. 8884-8890.

H.J. Kim et al., Controlled Prelithiation of Silicon Monoxide for High Performance lithium-Ion Rechargeable Full Cells, Nano Letters, 2016, 16, pp. 282-288.

H. Xu et al., Roll-to-Roll Prelithiation of Sn Foil Anode Suppresses Gassing and Enables Stable Full-Cell Cycling of Lithium Ion Batteries, Energy and Environmental Science, 2019, 12, pp. 2991-3000.

D. Lee et al., Optimal Condition of Solid-Electrolyte-Interphase Prepared by Controlled Prelithiation for High Performance Li-Ion Batteries, Journal of the Electrochemical Society, 2019, 166 (4), pp. A787-A792.

B. Parimalam et al., Reduction Reactions of Electrolyte Salts for Lithium Ion Batteries: LiPF6, LiBF4, LiDFOB, LiBOB, and LiTFSI, Journal of the Electrochemical Society, 2018, 165 (2), pp. A251-A255.

J. Jang et al., Molecularly Tailored Lithium-Arene Complex Enables Chemical Prelithiation of High-Capacity Lithium-Ion Battery Anodes, Angew. Chem. Int. Ed. 59 (34), 2020, pp. 14473-14480.

International Search Report, PCT/US/2022/031789, dated Jul. 11, 2022, 9 pages.

International Preliminary Report on Patentability, PCT/US2022/031789, dated Jan. 18, 2024, 8 pages.

* cited by examiner

PRELITHIATION OF FREE-STANDING SILICON DOMINANT ANODE BATTERIES

TECHNICAL FIELD

Aspects of the present disclosure relate to energy generation and storage. More specifically, certain embodiments of the disclosure relate to a method and system for prelithiation in lithium ion batteries.

BACKGROUND

Conventional approaches for battery anodes may be costly, cumbersome, and/or inefficient—e.g., they may be complex and/or time consuming to implement, and may limit battery lifetime.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

A system and/or method for prelithiation in lithium ion batteries, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION

The development of portable electronic devices and electrification of transportation drive the need for high performance electrochemical energy storage. Small-scale (<100 Wh) to large-scale (>10 KWh) devices primarily use lithium-ion (Li-ion) batteries over other rechargeable battery chemistries due to their high-performance.

Figure 1:
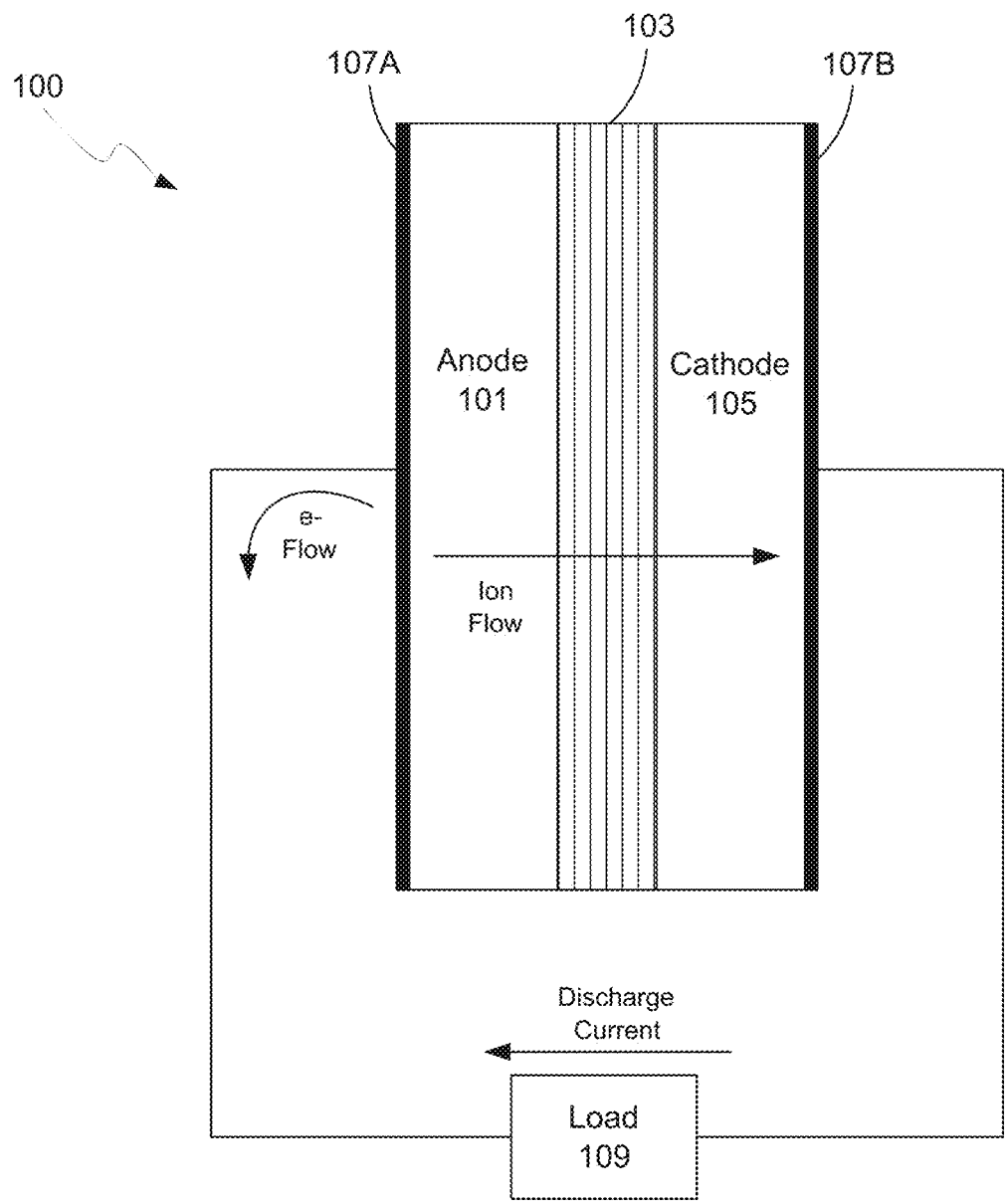
FIG. 1 is a diagram of a battery, in accordance with an example embodiment of the disclosure.

Li-ion batteries are the state-of-the-art technology for various applications. They not only dominate the small format battery market for portable electronics but also have been intensively pursued in the electric vehicle markets and stationary energy storage devices. Currently, the development of Li-ion batteries is dominated by the need for further performance improvements of gravimetric energy density and volumetric energy density in order to further boost the driving range of electric vehicles. To further improve the cell energy density, advanced electrode materials such as silicon (Si), Ge, Sn, P, Al, Sb, etc., anodes and high-voltage lithium and nickel rich layered transition metal oxide cathodes, such as NCA and NCM) cathodes became the focus of interest. These materials have enhanced gravimetric and volumetric capacities to achieve increased gravimetric energy and volumetric energy. However, these high energy cathodes suffer from high 1st cycle active lithium loss caused by lithium consuming parasitic reactions such as the formation of the solid electrolyte interphase (SEI) on the anode, active materials loss or irreversible Li metal plating on the anode. Moreover, these high capacity Li-ion battery anode materials continually consume active Li due to the SEI breakage and reformation, as a result of their large volume changes upon lithiation/de-lithiation during cycling. The loss of active Li from the cathode permanently decreases the available energy, leading to rapid capacity fade of the Li-ion cells FIG. 1 is a diagram of a battery, in accordance with an example embodiment of the disclosure. Referring to FIG. 1, there is shown a battery 100 comprising a separator 103 sandwiched between an anode 101 and a cathode 105, with current collectors 107A and 107B. There is also shown a load 109 coupled to the battery 100 illustrating instances when the battery 100 is in discharge mode. In this disclosure, the term "battery" may be used to indicate a single electrochemical cell, a plurality of electrochemical cells formed into a module, and/or a plurality of modules formed into a pack.

The anode 101 and cathode 105, along with the current collectors 107A and 107B, may comprise the electrodes, which may comprise plates or films within, or containing, an electrolyte material, where the plates may provide a physical barrier for containing the electrolyte as well as a conductive contact to external structures. In other embodiments, the anode/cathode plates may be immersed in electrolyte while an outer casing provides electrolyte containment. The anode 101 and cathode are electrically coupled to the current collectors 107A and 107B, which comprise metal or other conductive material for providing electrical contact to the electrodes as well as physical support for the active material in forming electrodes.

The configuration shown in FIG. 1 illustrates the battery 100 in discharge mode, whereas in a charging configuration, the load 107 may be replaced with a charger to reverse the process. In one class of batteries, the separator 103 is generally a film material, made of an electrically insulating polymer, for example, that prevents electrons from flowing from anode 101 to cathode 105, or vice versa, while being porous enough to allow ions to pass through the separator 103. Typically, the separator 103, cathode 105, and anode 101 materials are individually formed into sheets, films, or active material coated foils. Sheets of the cathode, separator and anode are subsequently stacked or rolled with the separator 103 separating the cathode 105 and anode 101 to form the battery 100. In some embodiments, the separator 103 is a sheet and generally utilizes winding methods and stacking in its manufacture. In these methods, the anodes, cathodes, and current collectors (e.g., electrodes) may comprise films.

In an example scenario, the battery 100 may comprise a solid, liquid, or gel electrolyte. The separator 103 preferably does not dissolve in typical battery electrolytes such as compositions that may comprise: Ethylene Carbonate (EC), Fluoroethylene Carbonate (FEC), Propylene Carbonate (PC), Dimethyl Carbonate (DMC), Ethyl Methyl Carbonate (EMC), Diethyl Carbonate (DEC), etc. with dissolved $LiBF_4$, $LiAsF_6$, $LiPF_6$, and $LiClO_4$ etc. The separator 103 may be wet or soaked with a liquid or gel electrolyte. In addition, in an example embodiment, the separator 103 does not melt below about 100 to 120° C., and exhibits sufficient mechanical properties for battery applications. A battery, in operation, can experience expansion and contraction of the anode and/or the cathode. In an example embodiment, the separator 103 can expand and contract by at least about 5 to 10% without failing, and may also be flexible.

The separator 103 may be sufficiently porous so that ions can pass through the separator once wet with, for example, a liquid or gel electrolyte. Alternatively (or additionally), the separator may absorb the electrolyte through a gelling or other process even without significant porosity. The porosity of the separator 103 is also generally not too porous to allow the anode 101 and cathode 105 to transfer electrons through the separator 103.

The anode 101 and cathode 105 comprise electrodes for the battery 100, providing electrical connections to the device for transfer of electrical charge in charge and discharge states. The anode 101 may comprise silicon, carbon, or combinations of these materials, for example.

Anode electrodes (negative electrodes) currently used in the rechargeable lithium-ion cells typically have a specific capacity of approximately 200 milliamp hours per gram (including the metal foil current collector, conductive additives, and binder material). Graphite, the active material used in most lithium ion battery anodes, has a theoretical energy density of 372 milliamp hours per gram (mAh/g). In comparison, silicon has a high theoretical capacity of up to 4200 mAh/g. In order to increase volumetric and gravimetric energy density of lithium-ion batteries, silicon may be used as the active material for the cathode or anode. Silicon anodes may be formed from pure silicon or from silicon composites. In some embodiments, the anode is formed from materials having high Si content, for example more than 50 wt. % silicon. Several types of silicon materials, e.g., silicon nanopowders, silicon nanofibers, porous silicon, and ball-milled silicon, have also been reported as viable candidates as active materials for the negative or positive electrodes. Small particle sizes (for example, sizes in the nanometer range) generally can increase cycle life performance. They also can display very high initial irreversible capacity. However, small particle sizes also can result in very low volumetric energy density (for example, for the overall cell stack) due to the difficulty of packing the active material. Larger particle sizes, (for example, sizes in the micron range) generally can result in higher density anode material. However, the expansion of the silicon active material can result in poor cycle life due to particle cracking. For example, silicon can swell in excess of 300% upon lithium insertion. Because of this expansion, anodes including silicon should be allowed to expand while maintaining electrical contact between the silicon particles.

Cathode electrodes (positive electrodes) described herein may include metal oxide cathode materials, such as lithium cobalt oxide ($LiCoO_2$) (LCO), lithium manganese oxide (LMO), Ni-rich oxides, high voltage cathode materials, lithium-rich oxides, nickel-rich layered oxides, lithium rich layered oxides, high-voltage spinel oxides, and high-voltage polyanionic compounds. Ni-rich lithium oxides and/or high voltage cathode materials may include nickel-manganese-cobalt (NMC or NCM) and nickel cobalt aluminum oxide (NCA). One example of a NCM material includes $LiNi_{0.6}Co_{0.2}Mn_{0.2}O_2$ (NCM-622). Lithium rich oxides may include $xLi_2Mn_3O_2\cdot(1-x)LiNi_aCo_bMn_cO_2$. Nickel-rich layered oxides may include $LiNi_{1+x}M_{1-x}O_z$ (where M=Co, Mn or Al). Lithium rich layered oxides may include $LiNi_{1+x}M_{1-x}O_2$ (where M=Co, Mn or Ni). High-voltage spinel oxides may include $LiNi_{0.5}Mn_{1.5}O_4$. High-voltage polyanionic compounds may include phosphates, sulfates, silicates, etc.

In certain embodiments, the positive electrode may be one of NCA, NCM, LMO or LCO. The NCM cathodes include NCM 9 0.5 0.5, NCM811, NCM622, NCM532, NCM433, NCM111, and others. In further embodiments, the positive electrode comprises a lithium-rich layered oxide $xLi_2MnO_3\cdot(1-x)LiNi_aCo_bMn_cO_2$; nickel-rich layered oxide $LiNi_{1-x}M_xO_2$ (M=Co, Mn and Al); or lithium rich layered oxide $LiNi_{1+x}M_{1-x}O_2$ (M=Co, Mn and Ni) cathode.

In an example scenario, the anode 101 and cathode 105 store the ion used for separation of charge, such as lithium. In this example, the electrolyte carries positively charged lithium ions from the anode 101 to the cathode 105 in discharge mode, as shown in FIG. 1 for example, and vice versa through the separator 105 in charge mode. The movement of the lithium ions creates free electrons in the anode 101 which creates a charge at the positive current collector 107B. The electrical current then flows from the current collector through the load 109 to the negative current collector 107A. The separator 103 blocks the flow of electrons inside the battery 100, allows the flow of lithium ions, and prevents direct contact between the electrodes.

While the battery 100 is discharging and providing an electric current, the anode 101 releases lithium ions to the cathode 105 via the separator 103, generating a flow of electrons from one side to the other via the coupled load 109. When the battery is being charged, the opposite happens where lithium ions are released by the cathode 105 and received by the anode 101.

The materials selected for the anode 101 and cathode 105 are important for the reliability and energy density possible for the battery 100. The energy, power, cost, and safety of current Li-ion batteries need to be improved in order to, for example, compete with internal combustion engine (ICE) technology and allow for the widespread adoption of electric vehicles (EVs). High energy density, high power density, and improved safety of lithium-ion batteries are achieved with the development of high-capacity and high-voltage cathodes, high-capacity anodes and functionally non-flammable electrolytes with high voltage stability and interfacial compatibility with electrodes. In addition, materials with low toxicity are beneficial as battery materials to reduce process cost and promote consumer safety.

The performance of electrochemical electrodes, while dependent on many factors, is largely dependent on the robustness of electrical contact between electrode particles, as well as between the current collector and the electrode particles. The electrical conductivity of silicon anode electrodes may be manipulated by incorporating conductive additives with different morphological properties. Carbon black (SuperP), vapor grown carbon fibers (VGCF), and a mixture of the two have previously been incorporated separately into the anode electrode resulting in improved performance of the anode. The synergistic interactions between the two carbon materials may facilitate electrical contact throughout the large volume changes of the silicon anode during charge and discharge.

State-of-the-art lithium-ion batteries typically employ a graphite-dominant anode as an intercalation material for lithium. Silicon-dominant anodes, however, offer improvements compared to graphite-dominant Li-ion batteries. Silicon exhibits both higher gravimetric (3579 mAh/g vs. 372 mAh/g for graphite) and volumetric capacities (2194 mAh/L vs. 890 mAh/L for graphite). In addition, silicon-based anodes have a lithiation/delithiation voltage plateau at about 0.3-0.4V vs. Li/Li+, which allows it to maintain an open circuit potential that avoids undesirable Li plating and dendrite formation. While silicon shows excellent electrochemical activity, achieving a stable cycle life for silicon-based anodes is challenging due to silicon's large volume changes during lithiation and delithiation. Silicon regions may lose electrical contact from the anode as large volume changes coupled with its low electrical conductivity separate the silicon from surrounding materials in the anode.

In addition, the large silicon volume changes exacerbate solid electrolyte interphase (SEI) formation, which can further lead to electrical isolation and, thus, capacity loss. Expansion and shrinkage of silicon particles upon charge-discharge cycling causes pulverization of silicon particles, which increases their specific surface area. As the silicon surface area changes and increases during cycling, SEI repeatedly breaks apart and reforms. The SEI thus continually builds up around the pulverizing silicon regions during cycling into a thick electronic and ionic insulating layer. This accumulating SEI increases the impedance of the electrode and reduces the electrode electrochemical reactivity, which is detrimental to cycle life.

As discussed above, the increasing necessity to develop high performance electrochemical energy storage is driven by the rapid development of portable electronic devices and electrification of transportation. Lithium-ion batteries have received a lot of attention from small scale (<100 Wh) to large scale (>10 KWh) applications due to their high performance properties when compared with other rechargeable battery chemistries. To meet this increasing demand, the next energy storage technologies need advance materials with high volumetric and gravimetric capacities. However, most of these materials suffer from high first cycle active lithium losses, e.g., caused by solid electrolyte interphase (SEI) formation, which in turn hinder their broad commercial use to date. In general, although silicon is a promising next-generation anode material for lithium-ion batteries due to its high capacity, it suffers from loss of large initial capacity during first cycle resulting in loss of initial Li inventory required to complete irreversible electrochemical reactions. The loss of active lithium permanently decreases the available energy by the consumption of lithium from the positive electrode material.

Prelithiation is a method used to compensate for active lithium losses and, therefore, to increase the practical energy density. The inventors have discovered that Si-dominant anodes may be prelithiated using Li-organic compound complex solutions comprising either (1) naphthalene and metallic lithium (lithium naphthalenide) dissolved in tetrahydrofuran (THF) or (2) biphenyl or a substituted biphenyl compound and metallic lithium dissolved in dimethoxyethane (DME). These anodes may be used in Si dominant anode-based Li-ion full cells with different cathodes, such as LCO, LMO, Ni-rich NCM or NCA cathodes. Li-rich $xLi_2Mn_3O_2 \cdot (1-x)LiNi_aCo_bMn_cO_2$ cathode, Ni-rich layered oxide cathode $LiNi_{1-x}M_xO_2$, Li-rich layered oxide cathode $LiNi_{1+x}M_{1-x}O_2$ (where M=Co, Mn or Ni), High-voltage spinel oxide cathode $LiNi_{0.5}Mn_{1.5}O_4$, and high-voltage polyanionic cathodes, phosphates, sulfates, silicates. In an example, anode was fabricated using 20.92% silicon, 66.91% of a 6% solution of an aqueous-based PAI resin, and 12.07% of a viscosity modifier, and 0.1% of surfactant to form a slurry. The slurry was then coated on a 15 um copper foil and pyrolyzed at 650 deg C. under Argon atmosphere to produce an anode with 86% silicon and 14% pyrolyzed carbon.

The inventors have further discovered that for optimum prelithiation the solvent (THF, DME) is preferably substantially free (<0.1% by volume or weight) of inhibitor. Inhibitor typically present in ether-based solvents can scavenge and neutralize radical species thus preventing solvent autooxidation and improve the shelf life. Without wishing to be bound by theory, it is believed that since the chemical prelithiation involves an electron transfer reaction from a lithium radical complex to a silicon particle, the presence of an inhibitor could likely interfere with the electron transfer reaction to the silicon since it would be scavenging the radical species.

Additionally, in one embodiment, the active material (e.g. Si-dominant anode) being prelithiated is substantially free of oxygen. In these anodes the only oxygen present is the native oxide layer. Presence of oxygen can prevent formation of organic radical species that are needed to form the lithium-organic complex solution. Substantially free of oxygen may be less than 2000 ppm, and/or less than 20% by volume.

In other embodiments, lithium naphthalenide may also be used as a lithiating agent for lithium ion battery cathodes in the same manner as for anodes. A Li-organic complex solution comprising naphthalene and metallic lithium dissolved in an THF, in order to prelithiate lithium ion battery cathodes (e.g. LCO, LMO, LFP, Ni-rich NCA, NCM, Li-rich layer cathodes, LNMO, etc.) in order to compensate for the initial Li loss and improve the overall cycle performance and energy density of Si anode-based Li-ion batteries.

In a separate embodiment, lithiating agents for lithium ion battery may be introduced into the battery electrolyte as an additive. In these embodiments, the lithium complex solution is directly added to the electrolyte and prelithiation occurs during full cell formation cycle. The difference with the current method of chemical prelithiation is the elimination of the silicon anode dip coating step before cell assembly. The lithium complex solution is mixed with the electrolyte in volume ratios ranging from 20 to 40%. During cell formation the lithium complex is electrochemically consumed to enable prelithiation of silicon anode. For example, when using a biphenyl organic molecule, the lithium biphenyl radicals can effectively react with silicon anodes to achieve prelithiation.

In another example, a solution containing high concentration of Li-biphenyl (BP) reacted with lithium metal prepared in dimethoxyethane (DME) may be included in the battery electrolyte as an additive and the prelithiation of Si-dominant anodes may be achieved during the formation cycle. An inhibitor such as butylated hydroxytoluene (BHT) is added to the battery electrolyte solution in order to stabilize the Li-BP complex and enable prelithiation. Here an inhibitor may be needed in order to minimize potential electron transfer from the lithium complex radical to the solvent molecule.

Organic compounds such as naphthalene, biphenyl (BP) and methyl-substituted biphenyl solutes, e.g. 2-methyl biphenyl, 4,4'-dimethyl biphenyl, and 3,3',4,4'-tetramethyl biphenyl, may be reacted with lithium metal (Li) at various ratios such as organic compound:Li (1:5), (1:4), (1:3), (1:2), (1:1) etc. and may be added directly into the battery electrolyte to be used as the prelithiating agent. During the battery formation cycle, the Li-organic complex can form at the surface of the Si-dominant anodes and effectively transfer a Li ion and an electron to the silicon to achieve prelithiation.

The organic compounds that may be used can form radical anions and include substituted or unsubstituted naphthalene and biphenyl compounds. Various moieties used in the organic compounds are described below.

As used herein, the term "alkyl" refers to a straight or branched, saturated, aliphatic radical having the number of carbon atoms indicated. The alkyl moiety may be branched or straight chain. For example, C1-C6 alkyl includes, but is not limited to, methyl, ethyl, propyl, isopropyl, butyl, isobutyl, sec-butyl, tert-butyl, pentyl, isopentyl, hexyl, etc. Other alkyl groups include, but are not limited to heptyl, octyl, nonyl, decyl, etc. Alkyl can include any number of carbons, such as 1-2, 1-3, 1-4, 1-5, 1-6, 1-7, 1-8, 1-9, 1-10, 1-11, 1-12, 1-20, 1-25, 1-30, 2-3, 2-4, 2-5, 2-6, 3-4, 3-5, 3-6, 4-5, 4-6 and 5-6. Named alkyl groups include, but are not limited to 1 carbon meth-(methyl), 2 carbons eth-(ethyl); 3 carbons-prop-(propyl), 4 carbons-but-(butyl), 5 carbon pent-(pentyl), 6 carbon hex-(hexyl), 7 carbon hept-(heptyl), 8 carbon oct-(octyl), 9 carbon non-(nonyl), 10 carbon dec-(decyl), 11 carbon undec-(undecyl), 12 carbon dodec-(dodecyl, also lauryl), 13 carbon tridec-(tridecyl), 14 carbon tetradec-(tetradecyl, also myristyl), 15 carbon pentadec-(pentadecyl), 16 carbon hexadec-(hexadecyl, cetyl), 17 carbon heptadec-(heptadecyl), 18 carbon octadec-(octadecyl, also stearyl), 19 carbon nonadec-(nonadecyl), 20 carbon eicos-(eicosyl, also arachidyl). The alkyl group is typically monovalent, but can be divalent, such as when the alkyl group links two moieties together.

The term "fluoro-alkyl" refers to an alkyl group where one, some, or all hydrogen atoms have been replaced by fluorine.

The term "alkylene" refers to an alkyl group, as defined above, linking at least two other groups, i.e., a divalent hydrocarbon radical. The two moieties linked to the alkylene can be linked to the same atom or different atoms of the alkylene. For instance, a straight chain alkylene can be the bivalent radical of —$(CH_2)_n$—, where n is 1, 2, 3, 4, 5, 6, 7, 8, 9, 10 or more. Alkylene groups include, but are not limited to, methylene, ethylene, propylene, isopropylene, butylene, isobutylene, sec-butylene, pentylene and hexylene.

The term "alkoxy" refers to alkyl group having an oxygen atom that either connects the alkoxy group to the point of attachment or is linked to two carbons of the alkoxy group. Alkoxy groups include, for example, methoxy, ethoxy, propoxy, iso-propoxy, butoxy, 2-butoxy, iso-butoxy, sec-butoxy, tert-butoxy, pentoxy, hexoxy, etc. The alkoxy groups can be further substituted with a variety of substituents described within. For example, the alkoxy groups can be substituted with halogens to form a "halo-alkoxy" group, or substituted with fluorine to form a "fluoro-alkoxy" group.

The term "alkenyl" refers to either a straight chain or branched hydrocarbon of 2 to 6 carbon atoms, having at least one double bond. Examples of alkenyl groups include, but are not limited to, vinyl, propenyl, isopropenyl, 1-butenyl, 2-butenyl, isobutenyl, butadienyl, 1-pentenyl, 2-pentenyl, isopentenyl, 1,3-pentadienyl, 1,4-pentadienyl, 1-hexenyl, 2-hexenyl, 3-hexenyl, 1,3-hexadienyl, 1,4-hexadienyl, 1,5-hexadienyl, 2,4-hexadienyl, or 1,3,5-hexatrienyl. Alkenyl groups can also have from 2 to 3, 2 to 4, 2 to 5, 3 to 4, 3 to 5, 3 to 6, 4 to 5, 4 to 6 and 5 to 6 carbons. The alkenyl group is typically monovalent, but can be divalent, such as when the alkenyl group links two moieties together.

The term "alkenylene" refers to an alkenyl group, as defined above, linking at least two other groups, i.e., a divalent hydrocarbon radical. The two moieties linked to the alkenylene can be linked to the same atom or different atoms of the alkenylene. Alkenylene groups include, but are not limited to, ethenylene, propenylene, isopropenylene, butenylene, isobutenylene, sec-butenylene, pentenylene and hexenylene.

The term "alkynyl" refers to either a straight chain or branched hydrocarbon of 2 to 6 carbon atoms, having at least one triple bond. Examples of alkynyl groups include, but are not limited to, acetylenyl, propynyl, 1-butynyl, 2-butynyl, isobutynyl, sec-butynyl, butadiynyl, 1-pentynyl, 2-pentynyl, isopentynyl, 1,3-pentadiynyl, 1,4-pentadiynyl, 1-hexynyl, 2-hexynyl, 3-hexynyl, 1,3-hexadiynyl, 1,4-hexadiynyl, 1,5-hexadiynyl, 2,4-hexadiynyl, or 1,3,5-hexatriynyl. Alkynyl groups can also have from 2 to 3, 2 to 4, 2 to 5, 3 to 4, 3 to 5, 3 to 6, 4 to 5, 4 to 6 and 5 to 6 carbons. The alkynyl group is typically monovalent, but can be divalent, such as when the alkynyl group links two moieties together.

The term "alkynylene" refers to an alkynyl group, as defined above, linking at least two other groups, i.e., a divalent hydrocarbon radical. The two moieties linked to the alkynylene can be linked to the same atom or different atoms of the alkynylene. Alkynylene groups include, but are not limited to, ethynylene, propynylene, butynylene, sec-butynylene, pentynylene and hexynylene.

The term "cycloalkyl" refers to a saturated or partially unsaturated, monocyclic, fused bicyclic, bridged polycyclic, or spiro ring assembly containing from 3 to 12, from 3 to 10, or from 3 to 7 ring atoms, or the number of atoms indicated. Monocyclic rings include, for example, cyclopropyl, cyclobutyl, cyclopentyl, cyclohexyl, and cyclooctyl. Bicyclic and polycyclic rings include, for example, norbornane, decahydronaphthalene and adamantane. For example, C3-C8 cycloalkyl includes cyclopropyl, cyclobutyl, cyclopentyl, cyclohexyl, cyclooctyl, and norbornane. As used herein, the term "fused" refers to two rings which have two atoms and one bond in common. For example, in the following structure, rings A and B are fused

As used herein, the term "bridged polycyclic" refers to compounds wherein the cycloalkyl contains a linkage of one or more atoms connecting non-adjacent atoms. The following structures

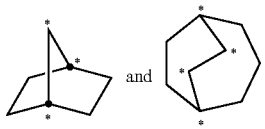

are examples of "bridged" rings. As used herein, the term "spiro" refers to two rings which have one atom in common and the two rings are not linked by a bridge. Examples of fused cycloalkyl groups are decahydronaphthalenyl, dodecahydro-1H-phenalenyl and tetradecahydroanthracenyl; examples of bridged cycloalkyl groups are bicyclo[1.1.1]pentyl, adamantanyl, and norbornanyl; and examples of spiro cycloalkyl groups include spiro[3.3]heptane and spiro[4.5]decane.

The term "cycloalkylene" refers to a cycloalkyl group, as defined above, linking at least two other groups, i.e., a divalent hydrocarbon radical. The two moieties linked to the cycloalkylene can be linked to the same atom or different atoms of the cycloalkylene. Cycloalkylene groups include, but are not limited to, cyclopropylene, cyclobutylene, cyclopentylene, cyclohexylene, and cyclooctylene.

The term "aryl" refers to a monocyclic or fused bicyclic, tricyclic or greater, aromatic ring assembly containing 6 to 16 ring carbon atoms. For example, aryl may be phenyl, benzyl or naphthyl, preferably phenyl. Aryl groups may include fused multicyclic ring assemblies wherein only one ring in the multicyclic ring assembly is aromatic. Aryl groups can be mono-, di- or tri-substituted by one, two or three radicals. Preferred as aryl is naphthyl, phenyl or phenyl mono- or disubstituted by alkoxy, phenyl, halogen, alkyl or trifluoromethyl, especially phenyl or phenyl-mono- or disubstituted by alkoxy, halogen or trifluoromethyl, and in particular phenyl.

The term "arylene" refers to an aryl group, as defined above, linking at least two other groups. The two moieties linked to the arylene are linked to different atoms of the arylene. Arylene groups include, but are not limited to, phenylene.

The term "heteroaryl" refers to a monocyclic or fused bicyclic or tricyclic aromatic ring assembly containing 5 to 16 ring atoms, where from 1 to 4 of the ring atoms are a heteroatom each N, O or S. For example, heteroaryl includes pyridyl, indolyl, indazolyl, quinoxalinyl, quinolinyl, isoquinolinyl, benzothienyl, benzofuranyl, furanyl, pyrrolyl, thiazolyl, benzothiazolyl, oxazolyl, isoxazolyl, triazolyl, tetrazolyl, pyrazolyl, imidazolyl, thienyl, or any other radicals substituted, especially mono- or di-substituted, by e.g. alkyl, nitro or halogen. Pyridyl represents 2-, 3- or 4-pyridyl, advantageously 2- or 3-pyridyl. Thienyl represents 2- or 3-thienyl. Quinolinyl represents preferably 2-, 3- or 4-quinolinyl. Isoquinolinyl represents preferably 1-, 3- or 4-isoquinolinyl. Benzopyranyl, benzothiopyranyl represents preferably 3-benzopyranyl or 3-benzothiopyranyl, respectively. Thiazolyl represents preferably 2- or 4-thiazolyl, and most preferred 4-thiazolyl. Triazolyl is preferably 1-, 2- or 5-(1,2,4-triazolyl). Tetrazolyl is preferably 5-tetrazolyl.

Preferably, heteroaryl is pyridyl, indolyl, quinolinyl, pyrrolyl, thiazolyl, isoxazolyl, triazolyl, tetrazolyl, pyrazolyl, imidazolyl, thienyl, furanyl, benzothiazolyl, benzofuranyl, isoquinolinyl, benzothienyl, oxazolyl, indazolyl, or any of the radicals substituted, especially mono- or di-substituted.

The term "heteroalkyl" refers to an alkyl group having from 1 to 3 heteroatoms such as N, O and S. The heteroatoms can also be oxidized, such as, but not limited to, —S(O)— and —S(O)$_2$—. For example, heteroalkyl can include ethers, thioethers, alkyl-amines and alkyl-thiols.

The term "heteroalkylene" refers to a heteroalkyl group, as defined above, linking at least two other groups. The two moieties linked to the heteroalkylene can be linked to the same atom or different atoms of the heteroalkylene.

The term "heterocycloalkyl" refers to a ring system having from 3 ring members to about 20 ring members and from 1 to about 5 heteroatoms such as N, O and S. The heteroatoms can also be oxidized, such as, but not limited to, —S(O)— and —S(O)$_2$—. For example, heterocycle includes, but is not limited to, tetrahydrofuranyl, tetrahydrothiophenyl, morpholino, pyrrolidinyl, pyrrolinyl, imidazolidinyl, imidazolinyl, pyrazolidinyl, pyrazolinyl, piperazinyl, piperidinyl, indolinyl, quinuclidinyl and 1,4-dioxa-8-aza-spiro[4.5]dec-8-yl.

The term "heterocycloalkylene" refers to a heterocyclalkyl group, as defined above, linking at least two other groups. The two moieties linked to the heterocycloalkylene can be linked to the same atom or different atoms of the heterocycloalkylene.

The term "optionally substituted" is used herein to indicate a moiety that can be unsubstituted or substituted by one or more substituent. When a moiety term is used without specifically indicating as substituted, the moiety is unsubstituted.

In accordance with the disclosure, organic compounds that may be used can form radical anions when reacted with lithium and include substituted or unsubstituted naphthalene and biphenyl compounds. General naphthalene (I) and biphenyl (II) structures are shown below:

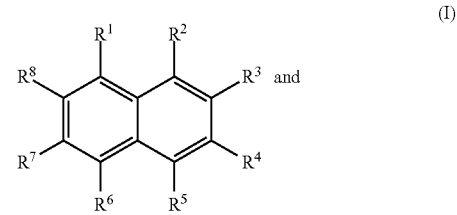

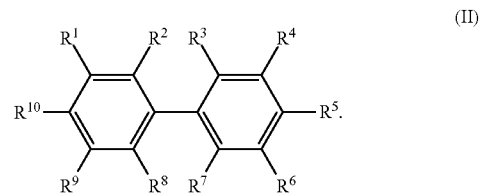

In some embodiments, each of $R^1$-$R^{10}$ may individually be H or alkyl as defined above. In other embodiments, each of $R^1$-$R^{10}$ may individually be selected from the group consisting of H, alkyl, fluoro-alkyl, alkylene, alkoxy, alkenyl, alkenylene, alkynyl, alkynylene, cycloalkyl, cycloalkylene, aryl, arylene, heteroaryl, heteroalkyl, heteroalkylene, heterocycloalkyl, and heterocycloalkylene, as defined above, which may be also optionally substituted. In a further embodiment, each of $R^1$-$R^{10}$ may individually be H or methyl.

The above organic compounds may be reacted in solution with various lithium concentrations (such as 1:1 molar ratio of Li:compound or other ratios, including but not limited to from about 5:1 to about 1:5 molar ratio of Li:compound).

Prelithiation is pre-doping of lithium ions. In a prelithiation process additional lithium is added to the reversible active lithium content present in lithium ion batteries. Prelithiation is a technique that may be used to compensate for active Li loss and, therefore, to increase the practical gravimetric energy or volumetric energy density. In a general Li-ion cell set-up, the active Li content is stored within the cathode materials (e.g. NCA, NCM, LCO, LMO, LFP, etc.) prior to battery cell operation. During the 1st charge of the cell, a certain amount of the active Li is typically lost, mostly by the SEI formation on the surface of the anode materials, depending on the working mechanisms of the active material, so that the remaining active Li content is reduced after the 1st charge/discharge cycle. One major strategy to overcome this issue is to store a certain amount of active Li in the anode materials by prelithiation prior to charge/discharge cycling. This can help particularly compensates for the active Li loss and thus leads to an increased active Li content after the 1st cycle and, leading to enhanced remaining cell energy. The prelithiation strategy is not limited to the anode materials, it is also possible to use prelithiation agents inside the cathode materials. In the majority of cases and independent from the pre-treatment concept, prelithiation is conducted to compensate the 1st cycle active Li loss, attributed mainly to the SEI formation. This increases the remaining amount of active Li inside the cell during ongoing charge/discharge cycling, leading to an increased reversible capacity and resulting in an increased energy density. In most studies, this is shown by a drastically increased Coulombic efficiency of the 1st cycle as well as an increased discharge capacity during the first few cycles.

Figure 2:
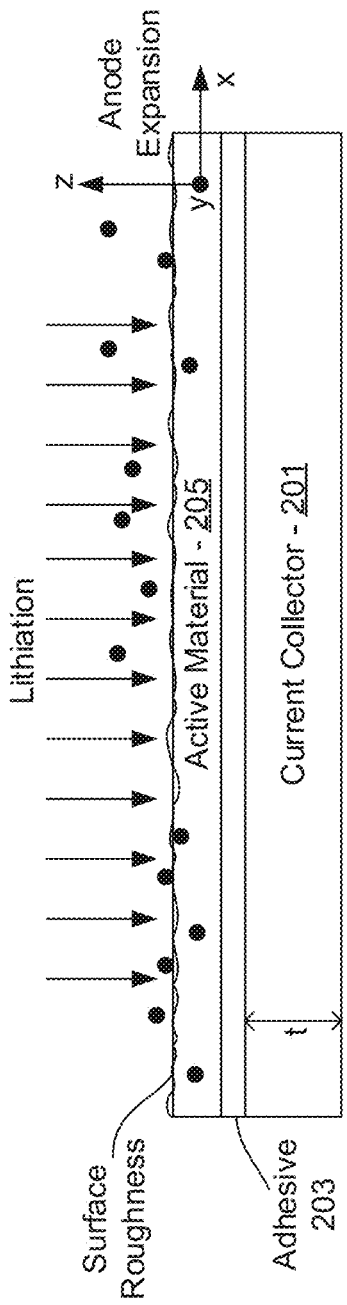
FIG. 2 illustrates anode expansion during lithiation, in accordance with an example embodiment of the disclosure.

FIG. 2 illustrates anode expansion during lithiation, in accordance with an example embodiment of the disclosure. Referring to FIG. 2, there are shown a current collector 201, an optional adhesive 203, and an active material 205. It should be noted that the adhesive 203 may or may not be present depending on the type of anode fabrication process utilized, as the adhesive is not necessarily there in a direct coating process where the active material is formed directly on the current collector. In an example scenario, the active material 205 comprises silicon particles in a binder material and a solvent, the active material 205 being pyrolyzed to turn the binder into a glassy carbon that provides a structural framework around the silicon particles and also provides electrical conductivity. The active material may be coupled to the current collector 201 using the optional adhesive 203. The current collector 201 may comprise a metal film, such as copper, nickel, or titanium, for example, although other conductive foils may be utilized depending on desired tensile strength.

FIG. 2 also illustrates lithium ions impinging upon and lithiating the active material 205. The lithiation of silicon-dominant anodes causes expansion of the material, where horizontal expansion is represented by the x and y axes, and thickness expansion is represented by the z-axis, as shown. The current collector 201 has a thickness t, where a thicker foil provides greater strength and providing the adhesive 203 is strong enough, restricts expansion in the x- and y-directions, resulting in greater z-direction expansion, thus anisotropic expansion. Example thicker foils may be greater than 6 μm, such as 10 μm or 20 μm for copper, for example, while thinner foils may be less than 6 μm thick in copper.

In another example scenario, when the current collector 201 is thinner, on the order of 5-6 μm for a copper foil, for example, the active material 205 may expand more easily in the x- and y-directions, although still even more easily in the z-direction without other restrictions in that direction. In this case, the expansion is anisotropic, but not as much as compared to the case of higher x-y confinement.

In addition, different materials with different tensile strength may be utilized to configure the amount of expansion allowed in the x- and y-directions. For example, nickel is a more rigid, mechanically strong metal for the current collector 201, and as a result, nickel current collectors confine x-y expansion when a strong enough adhesive is used. In this case, the expansion in the x- and y-directions may be more limited, even when compared to a thicker copper foil, and result in more z-direction expansion, i.e., more anisotropic. In anodes formed with 5 μm nickel foil current collectors, very low expansion and no cracking results. Furthermore, different alloys of metals may be utilized to obtain desired thermal conductivity, electrical conductivity, and tensile strength, for example.

In an example scenario, when an adhesive is used, the adhesive 203 comprises a polymer such as polyimide (PI) or polyamide-imide (PAI) that provides adhesive strength of the active material film 205 to the current collector 201 while still providing electrical contact to the current collector 201. Other adhesives may be utilized depending on the desired strength, as long as they can provide adhesive strength with sufficient conductivity following processing. If the adhesive 203 provides a stronger, more rigid bond, the expansion in the x- and y-directions may be more restricted, assuming the current collector is also strong. Conversely, a more flexible and/or thicker adhesive may allow more x-y expansion, reducing the anisotropic nature of the anode expansion.

Other advantages of prelithiation include, for example, better rate capability than the non-prelithiated electrodes, attributed to a decreased impedance. Furthermore, prelithiation of alloy type anodes, such as Si, Sn, Al, Sb, etc., can lead to a pre-volume-expansion, which decreases the relative volume change of Si during cycling, causing a reduced cracking and pulverization of Si during cycling and may enhance the mechanical electrode stability. In addition, as discussed above, prelithiation of Si causes a decrease in the elastic and shear moduli and an increase of the diffusion coefficient of Li, reducing the stress in comparison to pristine Si and leading to improved cycling performance. Finally, it may also be possible that prelithiation and the resulting SEI formation triggered by some techniques supersede the formation cycles of Li-ion batteries. However, the degree of prelithiation must be adjusted with high accuracy. Otherwise, an over-lithiation could lead to an excess of Li, thus Li metal plating on the anode material surface, resulting in safety hazards during the operation.

There are both electrochemical and chemical prelithiation techniques known for prelithiation including pre-lithiation with the help of additives, or prelithiation by direct contact with lithium metal. Li-organic complex solutions have been previously used to prelithiate silicon monoxide (SiO)-based negative electrodes. By the use of such prelithiation agents, the open circuit potential may shift to less noble values (anode has a more negative potential with respect to the cathode). The open circuit potential may also become stable after certain immersion time, as the degree of prelithiation may be controlled by the immersion time. A proposed mechanism of chemical prelithiation may be the following: the lithium ions are dissolved in solution due to the strong electron affinity of the organic moiety, resulting in the formation of a radical anion. Thereafter, the electron of the radical anion is transferred to the SiO material, recovering the initial state of the organic moiety and resulting in lithium ion uptake of the SiO active material (formation of $Li_xSiO$). The organic moiety may serve as an electron-transfer catalyst in this mechanism (Tabuchi et al).

Molecularly engineered aromatic hydrocarbons such as methyl-substituted biphenyls (BPs) have been used to adjust the electrochemical potential of the Li-organic complex below 0.3-0.4 V (electrochemical potential of lithiated silicon anode), which was shown to be effective towards prelithiation of Si-based anodes, via a solution-phase electron transfer reaction (Jang et al).

In an example embodiment of the disclosure, a method for using a prelithiation agent for prelithiation in lithium ion batteries is described. The disclosure describes using a prelithiation agent of lithium naphthalenide, which is a Li-organic complex solution comprising naphthalene and metallic lithium dissolved in THF, in order to prelithiate silicon dominant anodes, minimize the initial Li loss, and improve the overall cycle performance and energy density of Si anode-based Li-ion batteries with different cathodes, such as LCO, LMO, LFP, Ni-rich NCA, NCM, Li-rich layer cathodes, LNMO, etc. This strategy may also be used in other anode-based cells, such as graphite, conversion type anodes, such as transition metal oxides, transition metal phosphides, and other alloy type anodes, such as Sn, Sb, Al, P, etc. The same prelithiation agent may also be used for prelithiation of cathode materials.

Inhibitor-free solvents may be used to reduce any potential interference or impurities from inhibitors. In some embodiments, inhibitor-free THF or inhibitor-free DME may be used. Inhibitor-free solvents must be substantially free of inhibitor, i.e. have an inhibitor level of <0.1% when measured either by volume or by weight.

Lithium naphthalenide solutions in THF of various lithium concentrations may be utilized. In some example embodiments, 0.05 g (7.0 mmol), 1.0 g (14.0 mmol), 1.5 g (21.0 mmol), and/or 2.0 g (28 mmol) of polished lithium metals may be added to a solution of 1.0 gram of naphthalene (7.7 mmol) in 15 ml of an inhibitor-free THF to make various concentrations of the complex solution. Then, several of the anodes containing silicon may be immersed in each solution to produce the prelithiated silicon anodes.

Example devices and processes for device fabrication are generally described below, and the performances of lithium ion batteries with different compositions may be evaluated.

Figure 3:
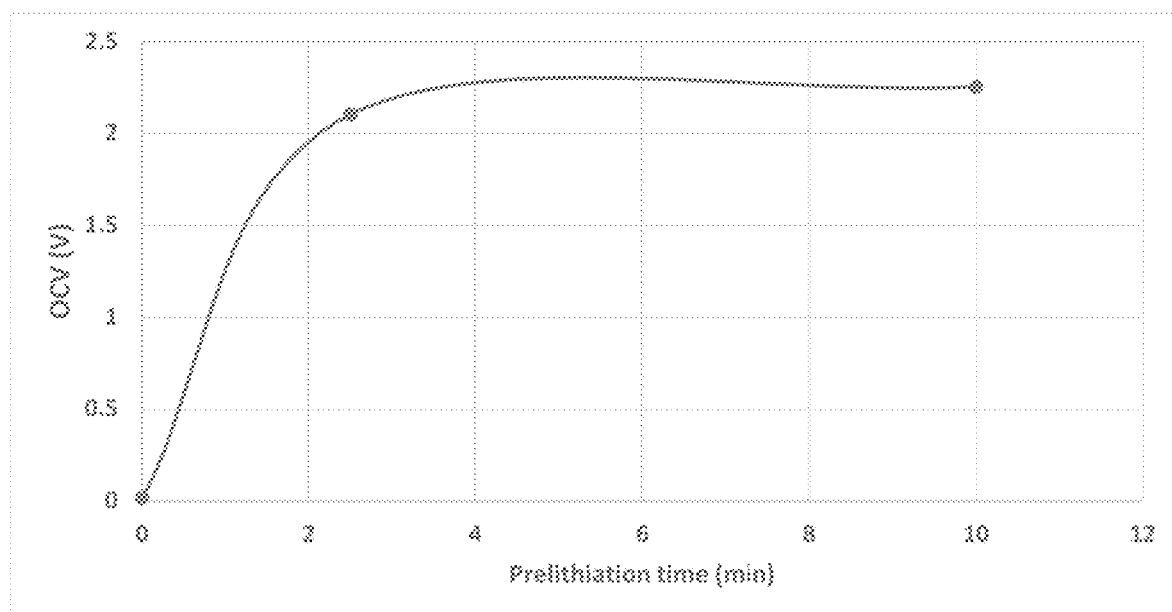
FIG. 3 shows the changes in the open-circuit voltage (OCV) of cells prelithiated for various times, in accordance with an example embodiment of the disclosure.

A lithium naphthalenide solution may be made by adding 60 mg of lithium metal to a solution containing 1.2 grams of naphthalene and 15 ml of inhibitor-free THF in an argon glovebox. Two pieces of free standing silicon anodes (Si: Graphite: Other carbons (80%:5%:15%)), laminated on copper foil, with a diameter of about 15 mm and loading between 2-5 mg on each side may then be immersed in 5 ml of the solution for various amount of time including 2.5 minutes, 10 minutes and overnight. Remove the anodes from the solution and wash 2-3 times with pure DME to remove the naphthalene and any other contaminants from the anodes, then dry. As-prepared anodes may be assembled into full coin-cells with NCA as the cathode, a liquid electrolyte, and a layer of Celgard 2500 Separator. FIG. 3 shows the changes in the open-circuit voltage (OCV) of these cells. The result indicates that the lithium naphthalenide solution can successfully lithiate silicon particles in the anode.

A high concentration solution of lithium biphenyl complex may be prepared by adding 0.146 grams of lithium metal to a solution containing 0.883 grams of 2-methylbiphenyl and 10 mL of inhibitor-free DME in an argon glovebox. Full coin cells with Si-dominant anode (86 wt. % silicon:14 wt. % pyrolytic carbon), a layer of Celgard 2500 separator and NCA as the cathode may be assembled. In order to achieve roughly 15% prelithiation of the anode, the liquid electrolyte may contain 22 vol. % of the lithium biphenyl complex solution. To improve stability of the lithium biphenyl complex solution, 1-5 vol. % of BHT may be added into the electrolyte to prevent electron transfer from the Li-organic complex to the carbonate-based solvent.

In another example, 2-methylbiphenyl may be dissolved into the liquid electrolyte at a concentration ranging from 0.05 to 0.5 mol/L. Full coin cells with Si-dominant anode (86 wt. % silicon:14 wt. % pyrolytic carbon), a liquid electrolyte containing the organic prelithiating additive, a layer of Celgard 2500 separator and NCA as the cathode may be assembled. During the formation cycle, the coin cells may be discharged at C/20 to 0 V until C/200 in order to electrochemically generate the radical anion form (i.e. reduced form) of 2-methylbiphenyl, and thus the lithium biphenyl complex which can later effectively prelithiate the anode in a solution-mediated electron transfer reaction.

Figure 4:
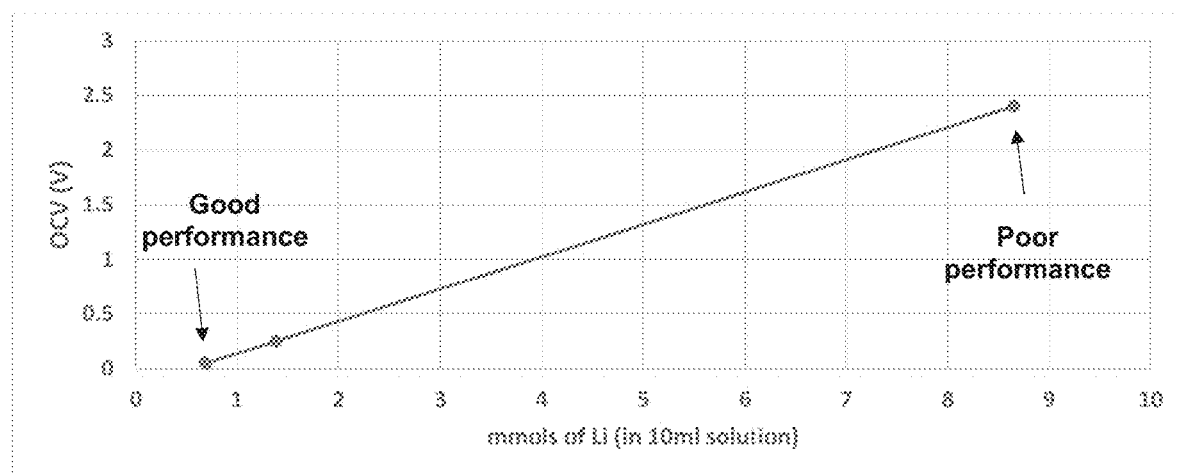
FIG. 4 shows the OCV of the cell versus lithium metal concentration in 10 ml of THF solution, in accordance with an example embodiment of the disclosure.

In another example, free-standing silicon anodes may be treated in lithium naphthalenide solutions with various lithium concentrations (such as 1:1 molar ratio of Li:naphthalene or other ratios, including but not limited to from about 5:1 to about 1:5 molar ratio of Li:naphthalene) and the OCV of the full coin-cells investigated in order to optimize the required amount lithiation to obtain improved cells with cycle life. FIG. 4 shows the OCV of cells versus lithium metal concentration in 10 ml of THF solution. Two anodes with similar diameters and loadings may be treated in each solution. Improved performance is seen at lower concentrations. In one embodiment, the lithium naphthalenide solution may be prepared by dissolving 1.2 g of naphthalene in 15 ml inhibitor-free THF and then adding 0.066 g lithium metal to the solution.

Figure 5:
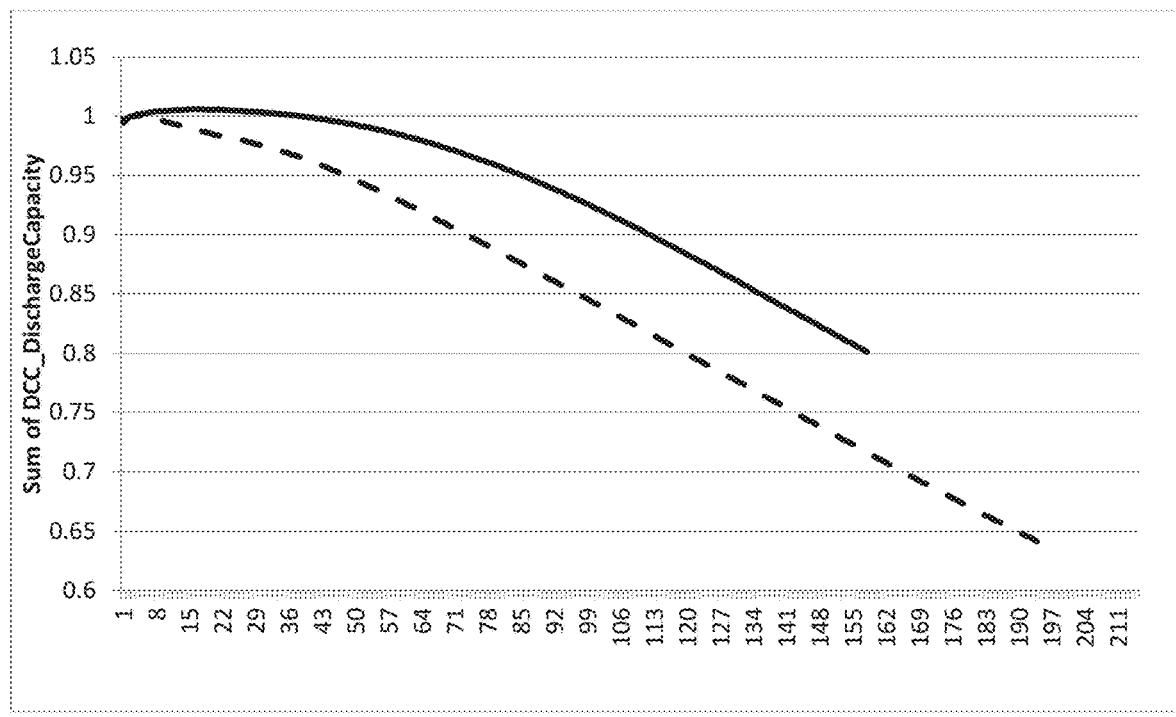
FIG. 5. compares the normalized capacity retention of an anode prelithiated using the lithium naphthalenide solution (solid line) to a non-treated anode (dashed line), in accordance with an example embodiment of the disclosure.

FIG. 5 compares the normalized capacity retention of an anode prelithiated using the lithium naphthalenide solution (solid line) to a non-treated anode (dashed line). The treated anode clearly shows a better cyclability. Cells may be cycled between 4.2V and 2.5V versus Li+/Li0 at 1C. The anode may be 80-95% silicon with the remainder being primarily pyrolytic carbon coated on copper. The solution may be made by adding 0.05 g (7.0 mmol) of a polished lithium metals to a solution containing 1.0 gram of naphthalene (7.7 mmol) in 15 ml of inhibitor-free THF.

Figure 6:
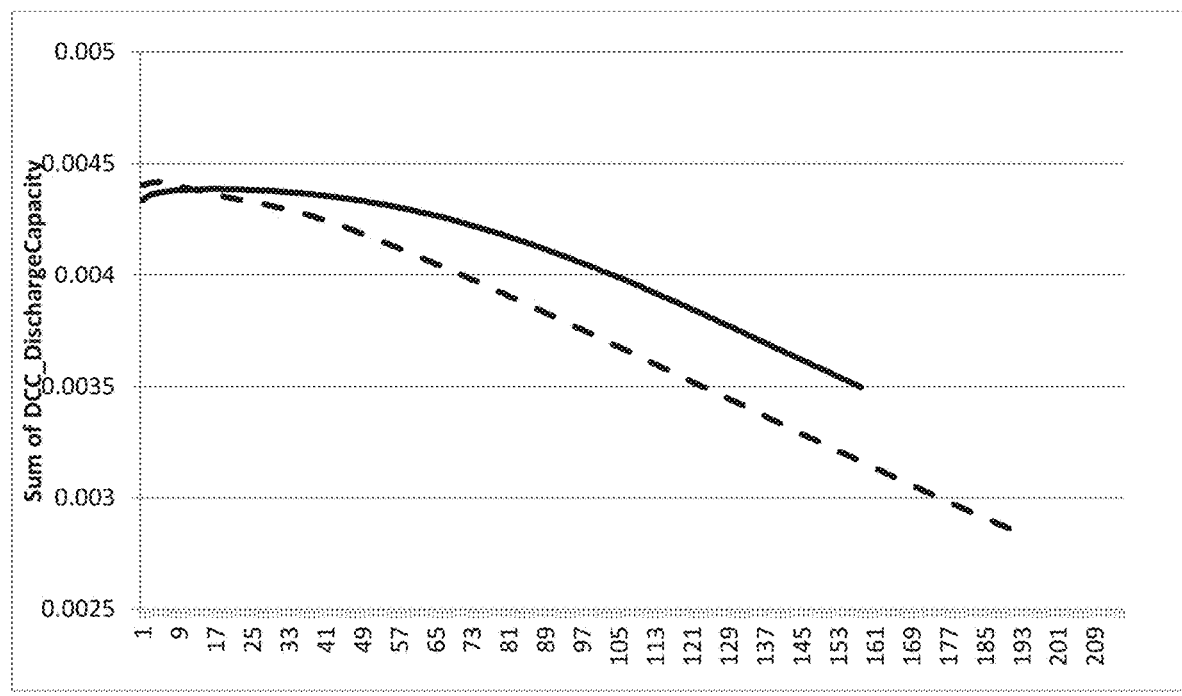
FIG. 6 shows the absolute capacity retention of an anode prelithiated using the lithium naphthalenide solution (solid line) to a non-treated anode (dashed line), in accordance with an example embodiment of the disclosure.

FIG. 6 shows the absolute capacity retention of an anode prelithiated using the above lithium naphthalenide solution (solid line) to a non-treated anode (dashed line). Capacity values are in Ah. The anode may be 80-95% silicon with the remainder being primarily pyrolytic carbon coated on copper.

Figure 7:
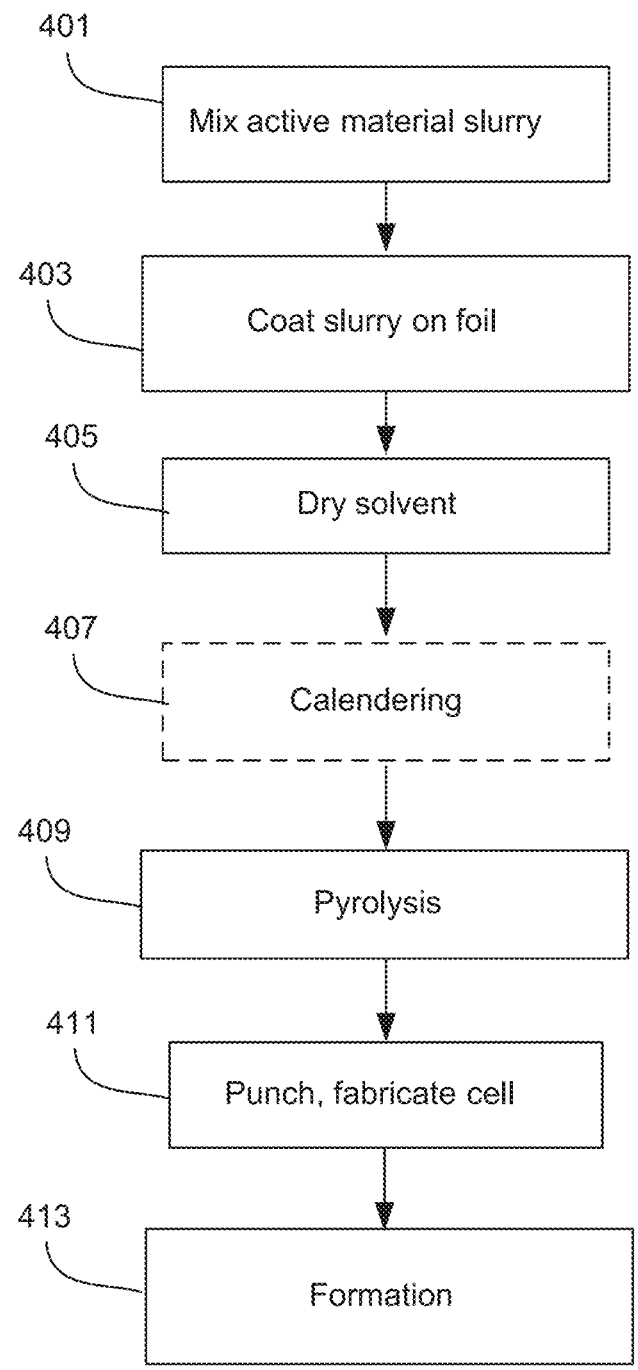
FIG. 7 is a flow diagram of a process for direct coating electrodes, in accordance with an example embodiment of the disclosure.

FIG. 7 is a flow diagram of a process for direct coating electrodes, in accordance with an example embodiment of the disclosure. This process comprises physically mixing the active material, conductive additive, and binder together, and coating it directly on a current collector. This example process comprises a direct coating process in which an anode slurry is directly coated on a copper foil using a binder such as CMC, SBR, Sodium Alginate, PAI, PAA, PI and mixtures and combinations thereof. Another example process comprising forming the active material on a substrate and then transferring to the current collector is described with respect to FIG. 8.

In step 401, the raw electrode active material may be mixed using a binder/resin (such as PI, PAI), solvent, and conductive carbon. In one example, graphene/VGCF (1:1 by weight) may be dispersed in NMP under sonication for, e.g., 45-75 minutes followed by the addition of Super P (1:1:1 with VGCF and graphene) and additional sonication for, e.g., 45-75 minutes. Silicon powder with a desired particle size, may then be dispersed in polyamic acid resin (12-18% solids in N-Methyl pyrrolidone (NMP)) at, e.g., 1800-1200 rpm in a ball miller for a designated time, and then the conjugated carbon/NMP slurry may be added and dispersed at, e.g., 1800-2200 rpm for, e.g., another predefined time to achieve a slurry viscosity within 2000-4000 cP and a total solid content of about 25-35%. The particle size and mixing times may be varied to configure the active material density and/or roughness.

In step 403, the slurry may be coated on the foil at a loading of, e.g., 3-4 mg/cm$^2$, which may undergo drying in step 405 resulting in less than 13-20% residual solvent content. In step 407, an optional calendering process may be utilized where a series of hard pressure rollers may be used to finish the film/substrate into a smoother and denser sheet of material.

In step 409, the active material may be pyrolyzed by heating to 500-800 C. such that carbon precursors are partially or completely converted into glassy carbon. The pyrolysis step may result in an anode active material having silicon content greater than or equal to 50% by weight, where the anode has been subjected to heating at or above 400 degrees Celsius. Pyrolysis can be done either in roll form or after punching in step 411. If done in roll form, the punching is done after the pyrolysis process. The punched electrode may then be sandwiched with a separator and cathode with electrolyte to form a cell. In step 413, the cell may be subjected to a formation process, comprising initial charge and discharge steps to lithiate the anode, with some residual lithium remaining.

Figure 8:
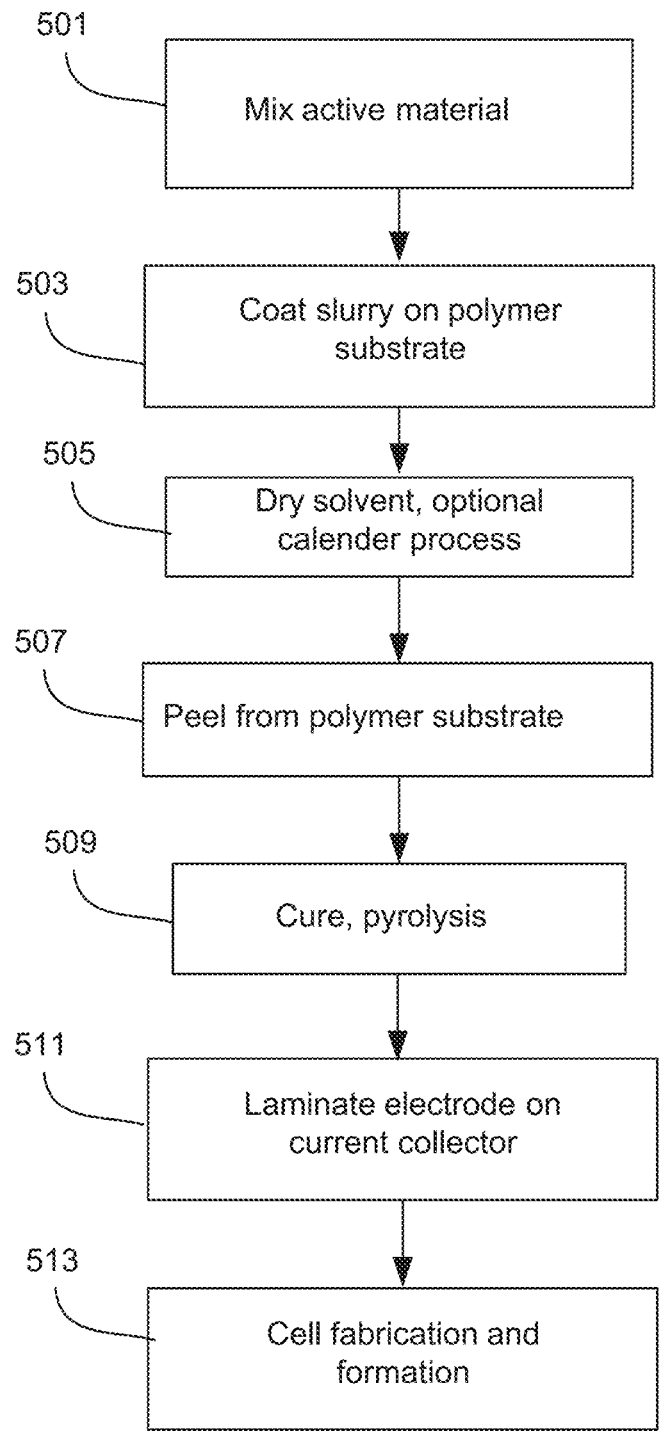
FIG. 8 is a flow diagram of an alternative process for lamination of electrodes, in accordance with an example embodiment of the disclosure.

FIG. 8 is a flow diagram of an alternative process for lamination of electrodes, in accordance with an example embodiment of the disclosure. While the previous process to fabricate composite anodes employs a direct coating process, this process physically mixes the active material, conductive additive, and binder together coupled with peeling and lamination processes.

This process is shown in the flow diagram of FIG. 8, starting with step 501 where the active material may be mixed with a binder/resin such as polyimide (PI) or polyamide-imide (PAI), solvent, one or more optional additives, and optionally a conductive carbon. As with the process described in FIG. 7, in one example, graphene/VGCF (1:1 by weight) may be dispersed in NMP under sonication for, e.g., 45-75 minutes followed by the addition of Super P (1:1:1 with VGCF and graphene) and additional sonication for, e.g., 45-75 minutes. Silicon powder with a desired particle size, may then be dispersed in polyamic acid resin (10-20% solids in N-Methyl pyrrolidone (NMP)) at, e.g., 800-1200 rpm in a ball miller for a designated time, and then the conjugated carbon/NMP slurry may be added and dispersed at, e.g., 1800-2200 rpm for, e.g., another predefined time to achieve a slurry viscosity within 2000-4000 cP and a total solid content of about 30%. The particle size and mixing times may be varied to configure the active material density and/or roughness.

In step 503, the slurry may be coated on a polymer substrate, such as polyethylene terephthalate (PET), polypropylene (PP), or Mylar. The slurry may be coated on the PET/PP/Mylar film at a loading of 3-4 mg/cm$^2$ (with 13-20% solvent content), and then dried to remove a portion of the solvent in step 505. An optional calendering process may be utilized where a series of hard pressure rollers may be used to finish the film/substrate into a smoothed and denser sheet of material.

In step 507, the green film may then be removed from the PET, where the active material may be peeled off the polymer substrate, the peeling process being optional for a polypropylene (PP) substrate, since PP can leave ~2% char residue upon pyrolysis. The peeling may be followed by a cure and pyrolysis step 509 where the film may be cut into sheets, and vacuum dried using a two-stage process (100-140° C. for 15 h, 200-240° C. for 5 h). The dry film may be thermally treated at 1000-1300° C. to convert the polymer matrix into carbon. The pyrolysis step may result in an anode active material having silicon content greater than or equal to 50% by weight, where the anode has been subjected to heating at or above 400 degrees Celsius.

In step 511, the pyrolyzed material may be flat press or roll press laminated on the current collector, where a copper foil may be coated with polyamide-imide with a nominal loading of 0.35-0.75 mg/cm$^2$ (applied as a 5-7 wt % varnish in NMP, dried 10-20 hour at 100-140° C. under vacuum). In flat press lamination, the silicon-carbon composite film may be laminated to the coated copper using a heated hydraulic press (30-70 seconds, 250-350° C., and 3000-5000 psi), thereby forming the finished silicon-composite electrode. In another embodiment, the pyrolyzed material may be roll-press laminated to the current collector.

In step 513, the electrode may then be sandwiched with a separator and cathode with electrolyte to form a cell. The cell may be subjected to a formation process, comprising initial charge and discharge steps to lithiate the anode, with some residual lithium remaining.

A prelithiation step may be a part of the processes described above. In one embodiment, a Li-organic complex solution comprising naphthalene and metallic lithium dissolved in an inhibitor-free THF may be added in an in-line process to a cell as part of electrolyte injection then rinsing out the material with DME before injecting electrolyte. A cell may be handled the same as a typical lithium ion cell on a production line. During the step of electrolyte injection, the Li-organic complex solution may be injected into the cell first. A vacuum may be used to ensure gas bubbles are released and full wetting is achieved. Time and temperature can be controlled so that the reaction could proceed to the intended point. After that, the Li-organic complex solution may be rinsed out with a solvent that will not harm the electrolyte for the cell such as DME, EMC, DEC, or other carbonate. The solvent may be dried before injecting electrolyte or the electrolyte may be injected without drying the solvent. Subsequently, the processing may be similar to that of a standard cell. In some embodiments, the rinsing step may be omitted.

In a further embodiment, a Li-organic complex solution comprising naphthalene and metallic lithium dissolved in an inhibitor-free THF may be added in an in-line process of moving an anode roll through the solution in a controlled environment in a roll-to-roll process (similar to dip coating) to prelithiate the anode before assembly. The speed of the anode process may be controlled to ensure appropriate prelithiation. A second vat of DME may be used to rinse the anode in-line with the process. A drying zone may be installed after the DME rinse to dry the anodes. In this example, a roll of anode may be unrolled, dipped into a vat of Li-organic complex solution. Time and temperature can be controlled so that the reaction could proceed to the intended point as the electrode material move through the vat and even afterwards as the electrode continues to be "wet". After that, the Li-organic complex solution may be rinsed out with a solvent that would not harm the electrolyte for the cell such as DME, EMC, DEC, or other carbonate. The solvent may be dried before injecting electrolyte or the electrolyte may be injected without drying the solvent. Subsequently, the processing may be similar to that of a standard cell. In some embodiments, the rinsing step may be omitted.

In an additional embodiment, an anode may be prelithiated via a batch process of immersing a roll of anode into a Li-organic complex solution comprising naphthalene and metallic lithium dissolved in an inhibitor-free THF where the amount of lithium is controlled so that the anode may be lithiated to the proper level. A second step of immersing the roll into DME and then a third step of drying the roll (e.g. in a vacuum drying process) may be used to process a roll at a time. In this example, a roll of anode may be dipped into a vat of Li-organic complex solution without unrolling. A vacuum may be used to ensure gas bubbles are released and full wetting is achieved. Time and temperature can be controlled so that the reaction could proceed to the intended point as the electrode roll is immersed or even afterwards as the electrode continues to be "wet". After that, the Li-organic complex solution may be rinsed out with a solvent that would not harm the electrolyte for the cell such as DME, EMC, DEC, or other carbonate. This may be done through another roll dip process (or a series of roll immersion processes). The solvent may be dried before injecting electrolyte or the electrolyte may be injected without drying the solvent. Subsequently, the processing may be similar to that of a standard cell. In some embodiments, the rinsing step may be omitted.

In another embodiment, an anode may be prelithiated via a solution-mediated electrochemical process where the prelithiating agent is directly introduced in the battery electrolyte solution, either in form of a lithium organic complex (e.g. Li-BP) or an organic redox mediator solute (e.g. BP), thus removing the need for the anode immersion step prior to cell assembly. Here the anode prelithiation may be taking place in situ during the battery formation cycle.

Figure 9:
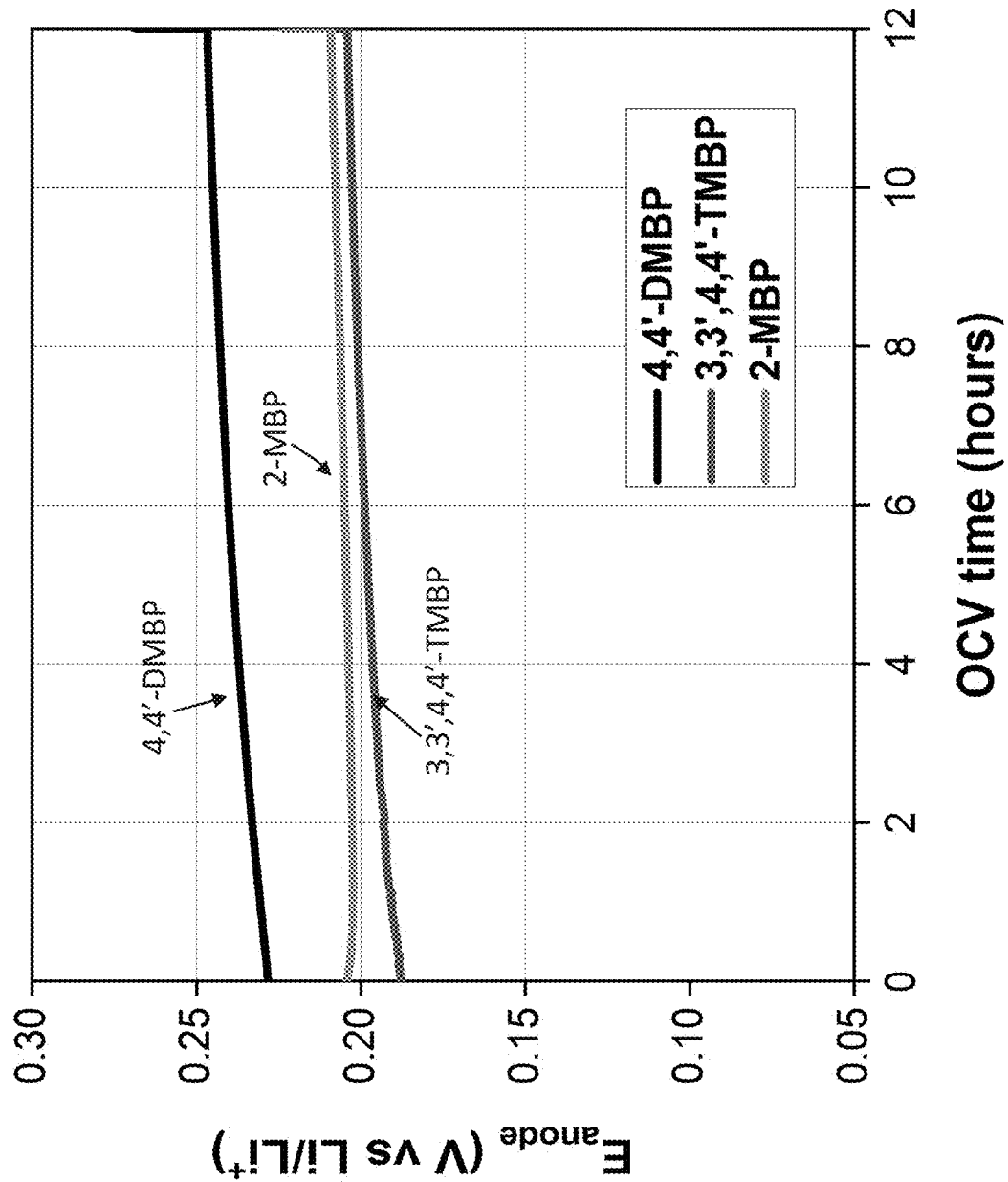
FIG. 9 shows the OCV vs. time of half cells with anodes prelithiated using lithium 4,4'-dimethylbiphenyl, lithium 3,3',4,4'-tetramethylbiphenyl and lithium 2-methylbiphenyl solutions, in accordance with an example embodiment of the disclosure.

FIG. 9 shows the OCV vs. time of half cells with free-standing silicon anodes (86 wt. % silicon:14 wt. % pyrolytic carbon) prelithiated using lithium 4,4'-dimethylbiphenyl (4,4'-DMBP), lithium 3,3',4,4'-tetramethylbiphenyl (3,3',4,4'-TMBP) and lithium 2-methylbiphenyl (2-MBP) solutions.

Figure 10:
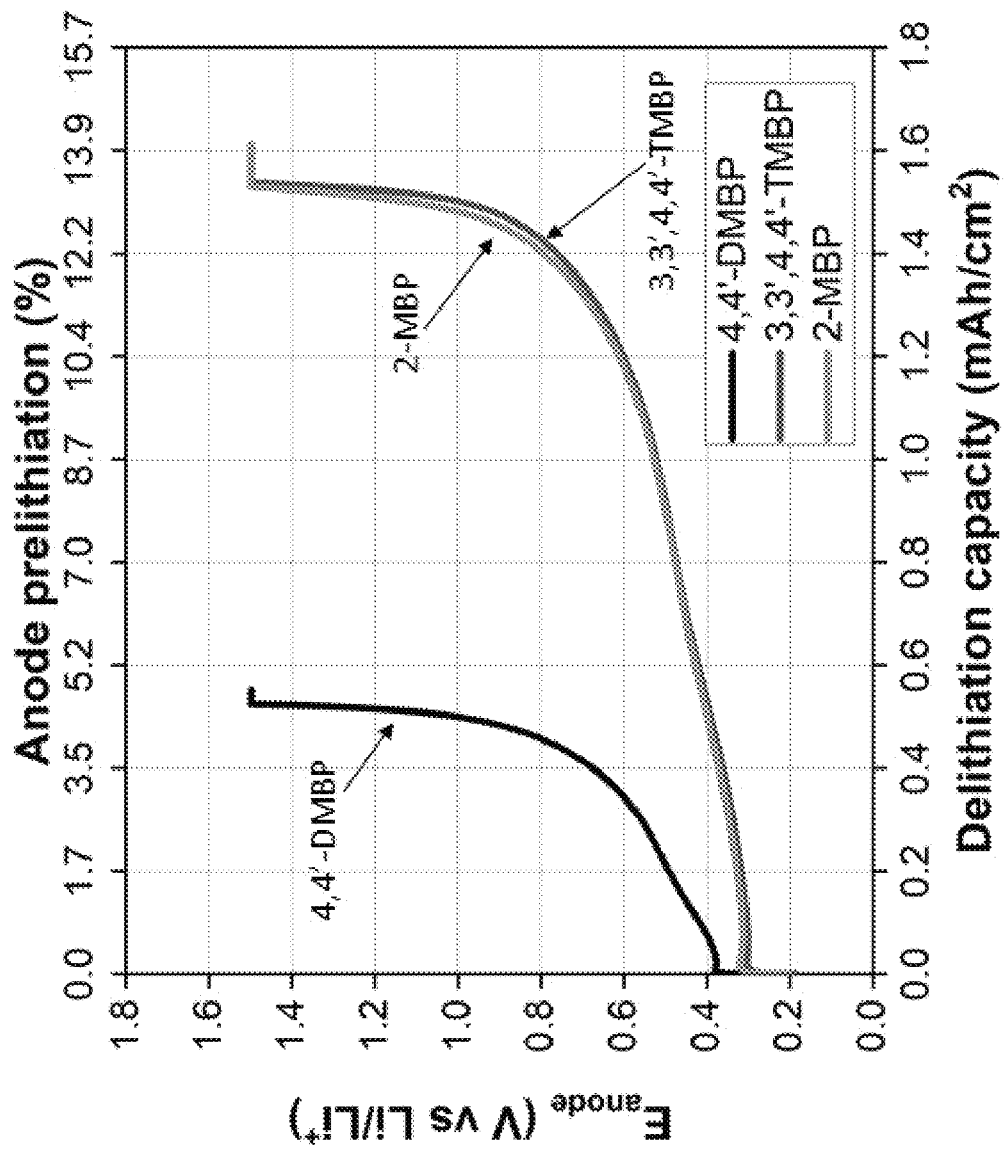
FIG. 10 shows the voltage vs. delithiation capacity and prelithiation amount of half cells with anodes prelithiated using lithium 4,4'-dimethylbiphenyl, lithium 3,3',4,4'-tetramethylbiphenyl and lithium 2-methylbiphenyl solutions, in accordance with an example embodiment of the disclosure.

FIG. 10 shows the voltage vs. delithiation capacity and prelithiation percentage of half cells with free-standing silicon anodes (86 wt. % silicon:14 wt. % pyrolytic carbon) prelithiated using lithium 4,4'-dimethylbiphenyl (4,4'-DMBP), lithium 3,3',4,4'-tetramethylbiphenyl (3,3',4,4'-TMBP) and lithium 2-methylbiphenyl (2-MBP) solutions.

Several advantages are brought about by the prelithiation process of the present disclosure. For example, the prelithiation method may produce one or more of the following advantages: (1) increased cycle life; (2) increased energy density; (3) increased the powder density; and or (4) decreased electrolyte consumption.

As utilized herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, a battery, circuitry or a device is "operable" to perform a function whenever the battery, circuitry or device comprises the necessary hardware and code (if any is necessary) or other elements to perform the function, regardless of whether performance of the function is disabled or not enabled (e.g., by a user-configurable setting, factory trim, configuration, etc.).

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

The invention claimed is:

1. A method of forming a battery, the method comprising:
forming a battery comprising a cathode, an electrolyte, and an anode;
wherein a prelithiation agent is contained in said electrolyte; and
wherein the prelithiation agent is a lithium complex solution which is directly added to the electrolyte and prelithiation occurs during full cell formation cycle; and
wherein the prelithiation agent comprises
lithium 4,4'-dimethylbiphenyl, lithium 3,3',4,4'-tetramethylbiphenyl or lithium 2-methylbiphenyl, formed from a solution comprising 4,4'-dimethylbiphenyl, 3,3',4,4'-tetramethylbiphenyl or 2-methylbiphenyl and metallic lithium dissolved in inhibitor-free DME; wherein the active material being prelithiated is substantially free of oxygen where the oxygen present is less than 2000 ppm and the only oxygen present is the native oxide layer; and
wherein said anode comprises 80-95% silicon with the remainder including carbon, pyrolytic carbon, and/or conductive additives; and
wherein said lithium complex solution is mixed with the electrolyte in volume ratios ranging from 20 to 40%.

2. The method according to claim 1, wherein said inhibitor-free DME has an inhibitor level of <0.1%.

* * * * *